United States Patent
Katz

[11] 4,377,185
[45] Mar. 22, 1983

[54] HYDROTEST APPARATUS

[75] Inventor: Lyber Katz, New York, N.Y.

[73] Assignee: Tubeco, Inc., Brooklyn, N.Y.

[21] Appl. No.: 217,669

[22] Filed: Dec. 18, 1980

[51] Int. Cl.³ .......................................... G01M 3/28
[52] U.S. Cl. ...................... 138/90; 73/49.6; 73/49.8
[58] Field of Search ............... 138/90; 73/49.8, 49.5, 73/49.1, 46, 49.6

[56] References Cited

U.S. PATENT DOCUMENTS 2,749,945  6/1956  Kaiser ................................. 138/90
3,179,127  4/1965  Terry .................................. 138/90

Primary Examiner—Edward R. Kazenske
Assistant Examiner—Joseph W. Roskos
Attorney, Agent, or Firm—Hopgood, Calimafde, Kalil, Blaustein & Judlowe

[57] ABSTRACT

The invention contemplates removable end-closure structure for sealed application to the end of a pipe of given outside diameter for hydrostatic pressure-testing the pipe. In the form disclosed, a circumferential wedge clamp is applied to the outer surface of the pipe end to be closed; a closure plate is applied in axial abutment with the pipe end; and a hydraulic flat jack is interposed between the closure plate and an outer reference or backing plate having circumferential connection to the wedge clamp. All parts may be in unit-handling relation, even when not mounted to a pipe end.

13 Claims, 5 Drawing Figures

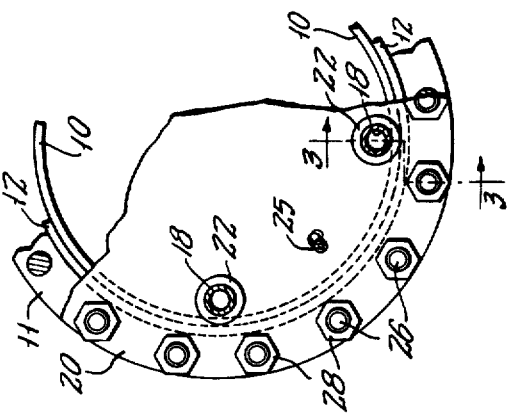
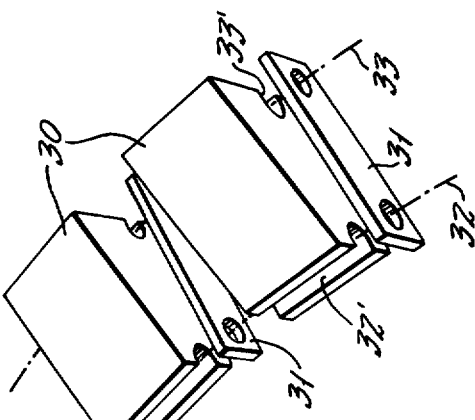
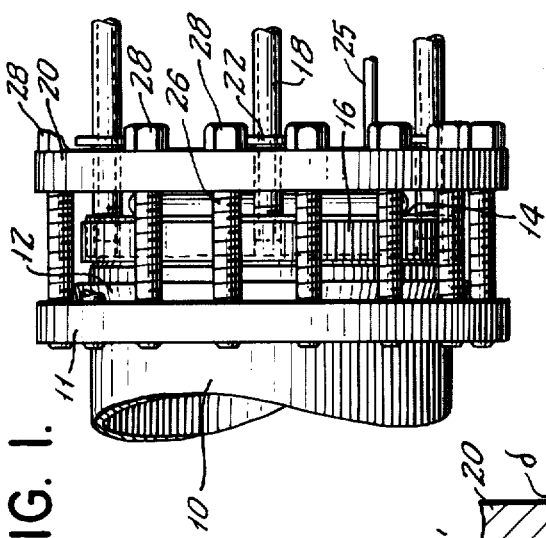
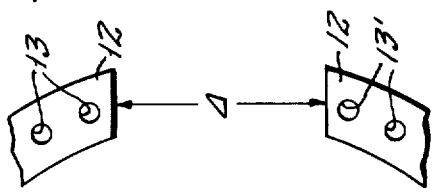
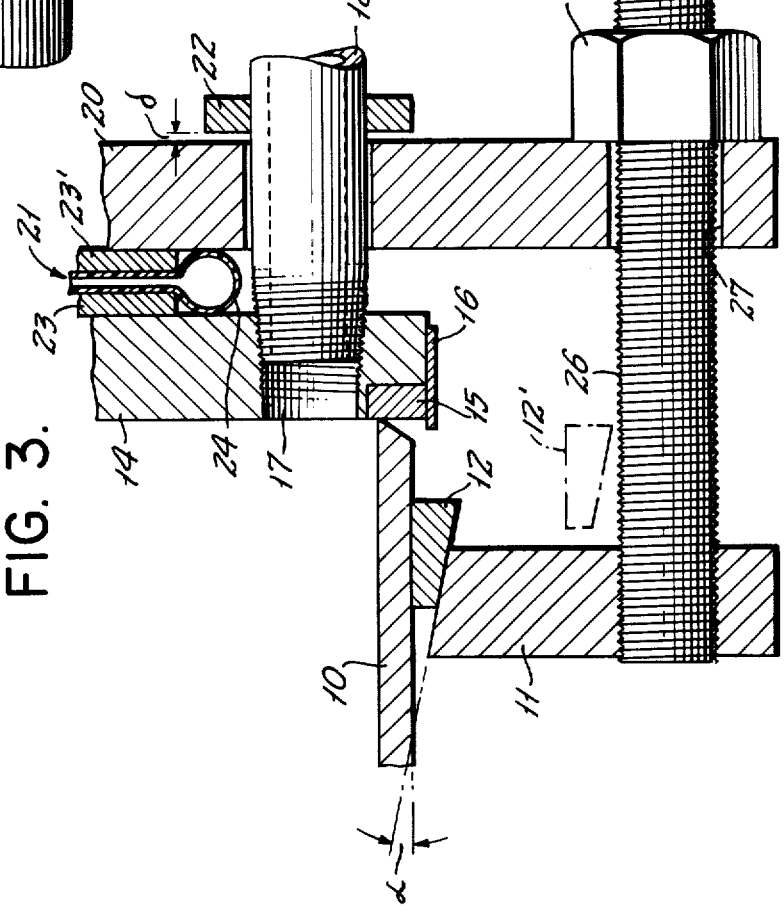

HYDROTEST APPARATUS

BACKGROUND OF THE INVENTION

The invention relates to removable end-closure structure for sealed application to the end of a pipe of given outside diameter, to enable hydrostatic pressure-testing of the pipe.

For certain end uses, pipe specifications require an ability to withstand relatively high internal hydrostatic pressures, for example, 500 psi of water for a fabricated pipe unit of 42-inch outer diameter. Such capability must be demonstrated before the assembled pipe unit leaves the premises of the pipe fabricator, and it is important that the hydrostatic-pressure capability be demonstrable, however complex the pipe section; for longitudinally seamed pipe, the maximum length of seam must be subject to the test, as well as any and all circumferentially seamed connections of bent and straight components of the particular fabricated-pipe unit.

For irregularly shaped assemblies, past practice has involved one of two techniques, to removably close each open end of a particular pipe assembly, prior to shipment. According to one technique, anchor fitments are welded to the outer surface of the pipe near the end to be closed, and a closure plate or head is welded to the pipe end, with referencing connection to the anchor fitments; of course, after the test, the welded connections must be severed, and refinishing is required if cosmetic appearance has any importance. According to the other technique, an elastomeric plug (of length approximating the diameter to be closed) is inserted within the bore of the pipe end to be closed, and the plug is expanded, by internal application of hydraulic pressure, into tightly sealed axial and circumferential engagement with the bore.

Both of these existing techniques have their distinct limitations. Each closure which involves welding necessarily also involves custom attention to establishment of the anchorage and of the closure, as well as to costly disassembly of the closure and cosmetic restoration. Further, it is a fact of life that large-diameter pipe is specified for its outer diameter, the inner diameter being not held to strict tolerance, so that any plug for a given pipe diameter presents a real problem of adaptability. Also, the problem of plug fitment is particularly severe for the case of large-diameter pipe which is the product of longitudinally welding rolled ends of sheet material. Still further, use of the plug technique requires such excessive insertion length as to preclude application to elbow ends and, to the extent of the insertion length, a longitudinal seam will not have been exposed to hydraulic fluid under pressure.

BRIEF STATEMENT OF THE INVENTION

It is an object of the invention to provide improved closure means for use in hydrostatic-pressure testing of pipe of the character indicated, and avoiding difficulties and limitations of prior techniques.

Another object is to provide such closure means which is removably and reusably applicable to closure of a succession of different pipe ends.

A further object is to achieve the above objects without any reliance upon or interference with free accessibility of pressurized hydraulic-test fluid to the entire bore surface of the pipe assembly under test.

It is also an object to achieve the above objects with means requiring no welding or other permanent connection to the pipe assembly under test.

A general object is to achieve the above objects with removal closure means which is relatively simple and foolproof in use, which is inherently adaptable to the highest hydrostatic-pressure levels currently specified for fabricated pipe, and which enables the more efficient, faster and less expensive conduct of hydrostatic testing of the character indicated.

The invention achieves the foregoing objects and further features by providing a circumferential wedge clamp applicable to the outer surface of the pipe end to be closed; a closure plate is applied in axial abutment with pipe end; and a hydraulic flat jack is interposed between the closure plate and an outer reference plate having circumferential connection to the wedge clamp. Applying hydraulic pressure to the flat jack not only axially compresses the closure plate to the pipe end but also tightens the wedge clamp. And application of hydraulic pressure within the pipe assembly in the course of the test in no way impairs the effectiveness of wedge-clamp action, in that flat-jack internal pressure can be regulated to a predetermined level in excess of the instantaneous level of test-fluid pressure.

DETAILED DESCRIPTION

The invention will be illustratively described in connection with the accompanying drawings, in which:

FIG. 1 is a simplified fragmentary view in side elevation, showing a pipe end removably closed by apparatus of the invention;

FIG. 2 is fragmentary end view of the apparatus of FIG. 1;

FIG. 3 is an enlarged fragmentary sectional view taken at 3—3 in FIG. 2;

FIG. 4 is an enlarged fragmentary end view of spaced ends of one embodiment of a clamp part shown in FIG. 3; and FIG. 5 is an enlarged fragmentary perspective view of another embodiment of a clamp part of FIG. 3.

In FIGS. 1 to 4, the invention is shown in application to removable closure of the open end of pipe element 10, being an element of a larger fabricated-pipe assembly to be subjected to hydrostatic pressure testing. The assembly will be understood to have one or more other open ends, each of which may be removably closed in the manner to be described for the end of element 10. As best seen in FIG. 3, the open end of element 10 is finished by a convergent bevel, as is customary in preparation for ultimate circumferentially welded assembly to a similarly finished end of another pipe element (not shown).

The closure relies upon circumferentially clamped axial reference to the outer surface of pipe element 10, in proximity to the end to be closed. The clamp comprises a circumferentially continuous ring member or anchor plate 11 having a concave tapered bore of slope α with respect to the axis of the open end of element 10, the taper being conical and divergent in the direction of the open end of element 10. Plate 11 is selected for its minimum diameter to readily clear the outer diameter of element 10, and also for wedging coaction with radially compressible ring means 12. As shown, ring means 12 is a stiffly compliant split ring having a cylindrical bore of unstressed diameter preferably greater than the outer diameter of pipe element 10 (phantom outline 12' in FIG. 3 will be understood to suggest the unstressed condition of ring means 12); ring 12 may be of the same stock (axial) thickness as plate 11, and its average radial thickness is selected such that, for the rated outer diameter of pipe element 10, its tapered outer convex surface (also of slope $\alpha$) will achieve an axially substantial, overlapped relation with the bore of anchor plate 11 when wedged between pipe element 10 and the bore of anchor plate 11. As best seen in FIG. 4, the split ends of ring 12 have an unstressed separation $\Delta$ and are provided with tapped holes 13—13' which serve for engagement by suitable tool means (not shown) for reducing the separation $\Delta$ in the course of adapting ring 12 to the outer surface of pipe element 10; ample tooling for such purpose may be provided by lugs respectively bolted to the spaced ends at 13—13', and by bolt means spanning such lugs and being accessible for selective take-up and/or release, using conventional socket-wrench or the like means.

A closure plate 14 is sized to radially overlap and abut the open end of pipe element 10. It is preferably rabbeted to receive gasket means 15 at the region of abutment with the end of element 10, and a circumferential strap 16 of diameter beyond possible interference with the pipe end is a welded part of plate 14 and spans the rabbeted region, serving to removably retain gasket material at 15; such material may suitably and illustratively be lead, leather, neoprene, or asbestos, depending on size, and pressure-sustaining requirements. Plate 14 is provided with a circumferentially spaced plurality of tapped axial holes 17 near but within the circle of pipe-end engagement. These holes 17 provide filling, venting and drainage for hydrostatic-test fluid, and a nipple connection 18 to each hole 17 projects axially outward for such purposes.

The nipples 18 serve the further function of retaining and guiding plate 14 for limited axial displacement with respect to a backing plate 20, under controlled expansion or contraction of an interposed hydraulic flat jack, designated generally 21. The retention function is via the threaded nipple engagements to plate 14 and via an external flange 22 welded to each nipple. The flat jack 21 comprises a circular envelope between spaced circular pressure plates 23—23' and having a circumferentially continuous axially yieldable bulbous closure 24 proximate to and within the circular locus of nipples 18; one or more port connections 25 to the flat-jack envelope via plate 20 provide filling, draining and pressurizing access to the flat jack 21.

The entire removable closure structure is completed by identification of a circumferentially distributed succession of tie rods 26, shown having full-threaded engagement to the anchor plate 11 and having clearance for axial-displacement motion through corresponding holes 27 in the backing plate 20. A nut 28 engaged to the projecting end of each of the tie rods 26 enables selective application of the clamp means 11-12, as well as a reference for axially driven abutment of plate 14 to the pipe end 10, via means 15.

In use, the described end-closure apparatus will be seen to be unit-handling, with the compliant wedge ring 12 in its relaxed condition (12') to provide ample clearance with the outer diameter of pipe element 10. After first checking the gasket means 15 for suitability, the closure apparatus is applied over and to the pipe end 10, i.e., with the pipe end 10 (a) within the tapered bore of anchor plate 11, (b) within the unstressed cylindrical bore of wedge ring 12, and (c) to the location of abutment with gasket means 15. With suitable tooling, the spaced ends of wedge ring 12 are drawn together, to the point of initially clamping ring 12 to the pipe end 10, e.g., in the relation suggested by solid outline at 12 in FIG. 3. Nuts 28 are then taken up (hand-tight with a wrench, or a set by an impact wrench), to draw the concave bore of anchor plate 11 into initial firm wedging contact with the correspondingly tapered surface of wedge ring 12; the extent of take-up at nuts 28 is sufficient when a predetermined minimum axial offset or clearance is observed at $\delta$, being the axial offset of each flange 22 from the outer surface of backing plate 20. An initial circumferentially sealed relation between plate 14 (at 15) and the beveled end of pipe element 10 is now achieved by application of at least the above-mentioned predetermined pressure to the hydraulic liquid contents of the flat-jack envelope, thereby indenting the pipe end into the material of gasket means 15; in the illustrative dimensional example given below, this predetermined minimum pressure is 200 psi.

The thus-far described operations are of course performed for all end closures serving the fabricated pipe section or assembly under test, thus readying the closed specimen for admission of hydraulic-test fluid, e.g., water. Such water is admitted via one or more nipples 18, other nipples being closed by external shut-off valves (not shown) as appropriate, leaving open at least the nipple 18 of greatest elevation, to assure full venting, so that no air pocket remains within the water-filled specimen. All but one of the remaining nipples 18 are then shut-off, and the single remaining open nipple is used for application of progressively elevating water pressure within the test specimen, it being noted that in the course of elevating pressure within the test specimen, flat-jack envelope pressure is also elevated, care being taken to preserve the predetermined differential (here illustratively 200 psi) by which flat-jack pressure exceeds test-specimen pressure. Unless a fault is sooner observed, the pressures continue to elevate until maximum specified hydrostatic pressure is reached within the specimen, with the flat-jack pressure further elevated to the extent of the indicated predetermined minimum differential. Specified observations are then made for absence of fault conditions at full pressure and, if required, after a specified period of time at full pressure.

Having performed all prescribed inspection and testing at full pressure, the pressure within the test specimen and the pressure within the flat jack 21 (i.e., within all flat jacks) are reduced, with the same care taken to assure the indicated minimum differential pressure throughout the pressure-reducing operation. Having reduced the test-specimen pressure to or near atmospheric, stop valves associated with the various nipples are opened for water drainage and concurrent air venting. And having completed drainage of the test specimen, the flat-jack pressure may be relieved. Upon relaxation of all nuts 28, each anchor plate 11 can be displaced to axially inwardly clear its associated wedge ring 12, whereupon the clamped condition of split ends of ring 12 can be relieved, allowing the stressed condition of ring 12 to be relieved, with restoration to the unstressed condition suggested at 12'. Each end-closure apparatus is then bodily removable from the tested specimen and is ready for reuse on the next specimen, subject of course to inspection and, if necessary, replacement or other servicing of the gasket means 15.

In an illustrative application of the described apparatus to removable end-closure of 42-inch (O.D.) longitudinally seamed steel pipe 10, to be hydrostatically exposed to internal pressure of 500 psi, the anchor plate 11 and the compressible wedge ring 12 were each formed of 2.5-inch thick steel, ring 11 having an outer diameter of 53.5 inches, and the wedge taper angle α being 10°. Each of the plates 14-20 was also of 2.5-inch steel. The gasket means 15 filled a circumferentially continuous rabbet of 43.5-inch outside diameter and 2.5-inch radial extent. The nipples 18 were of standard 2-inch steel pipe, mounted to plate 14 on a 37-inch diameter cycle of centers. All of sixteen tie rods 26 were of 2.0-inch threaded stock. The flat jack 21 was of 34-inch outer diameter, and had an envelope with the capacity to safely sustain applied hydraulic pressure of 1500 psi, being thus amply sufficient for maintenance of the 200 psi minimum pressure differential noted above. The entire hydrostatic test cycle is carried out by such apparatus at maximum efficiency and with no cosmetic damage to the applicable pipe end, even though the net axial force under hydrostatic-test load is in the order of 300 tons at each end closure.

In the modification of FIG. 5, the radially compressible ring means 12 of FIG. 3 is a circumferential succession of like wedge blocks 30, in loosely spaced angular interlace with strap elements 31. Two steel cables on circumferential alignments 32-33 pass through aligning apertures in the respective longitudinal ends of each of the strap elements 31; and between adjacent strap elements 31, the cables 32-33 locate in grooves 32'-33' of the respective axial-end faces of each of the wedge blocks 30. In one mode of employment, the cables 32-33 are each connected to define a continuous loop, with grooves 32'-33' sufficiently radially extensive to permit the range of radial accommodation needed for application to a given size (O.D.). In another mode of employment, the cables 32-33 are discontinuous, being finished at their ends with an angular separation Δ (as in FIG. 4) and with formations, such as a thimble-lined eye splice at each end of each cable, to permit suitable tool engagement for circumferentially tensed radial compression into initial wedge-setting engagement with the pipe element 10. Operation is as described for the single wedge ring 12 of FIG. 4, once anchor plate 11 has been engaged to all the wedge blocks 30.

It will be seen that the described apparatus meets all stated objects. It provides the advantages (a) of being able to test an entire longitudinal seam; (b) of being able to serve an entire range of wall thickness for a given pipe size, since applicable pipe is always specified for its outside diameter, whatever its wall thickness; (c) of being able to test a given-size pipe, whatever grooved, locally flattened or other contour may characterize the bore at the pipe end; (d) of requiring such short axial length for pipe-end clamping engagement as to be applicable to an elbow end or to a straight end; (e) of ready gasket re-sealability, in that any small leak development at gasket means 15 (as in the circumstance of one-too-many attempted re-uses of the same gasket insert) may be stopped by the expedient of raising the minimum pressure differential of flat-jack pressure with respect to hydrostatic load pressure within the specimen; (f) of inherent relative safety, in that in the event of excessive internal pressure applied within a given specimen, the onset of failure is characterized by slight leakage, which immediately reduces hydraulic pressure and thus prevents catastrophic release; (g) the cost of servicing and replacing gasket means 15 is relatively minor; and the specifically described 42-inch size apparatus has the inherent capability of handling double the described hydrostatic load within the test-specimen.

While the invention has been described in detail for a preferred embodiment, it will be understood that modifications may be made without departing from the claimed scope of the invention.

What is claimed is:

1. Removable end-closure structure for sealed application to the end of a pipe of given outside diameter for hydrostatic pressure-testing the pipe, said structure comprising a split ring having a cylindrical inner surface of substantially said diameter for mounting to the outer surface of the pipe near an end of the pipe, said split ring having a conical outer surface to be oriented with outward divergence in the direction of the pipe end to be closed, a circumferentially continuous anchor ring having a conically tapered bore of substantially the slope of the outer-surface taper of said split ring and adapted for convergent inwardly compressing coaction with said split ring upon axial displacement of said anchor ring in said pipe-end direction, a first or closure plate of diameter to lap the end of the pipe but less than the outer diameter of said anchor ring, said closure plate being adapted for circumferentially continuous axially abutted sealing engagement with the end of the pipe, said closure plate being characterized by a circumferentially continuous rabbet containing circumferentially continuous locally yieldable gasket material at least in the annular radius range of pipe-end contact, said rabbet being radially outwardly open, a circumferential strap peripherally secured to said closure plate and axially spanning the rabbeted region, a second or back-up plate of substantially the outer diameter of said anchor ring, lost-motion retaining means coaxially retaining said plates within a fixedly limited maximum axial offset of said back-up plate from said closure plate, axially adjustable tie means between radially lapping regions of said anchor ring and backing plate, and fluid-pressure operated means interposed between said plates for pressure-loading said plates for their axially separating relative displacement within said axial offset and in the direction of approach to the maximum of said axial offset.

2. The structure of claim 1, in which said gasket material is selected from the group including lead, leather, asbestos and an elastomeric.

3. The structure of claim 1, in which said tie means comprises an angularly distributed plurality of threaded tie members, on spaced parallel axes.

4. The structure of claim 1, in which said lost-motion retaining means comprises an angularly distributed plurality of tubular elements on spaced parallel axes, said tubular elements being secured to said closure plate at each of a plurality of fluid-communication openings near but within the bore diameter of the pipe, said tubular elements extending with clearance through aligned corresponding openings in said backing plate, and each said tubular element having an external flange for lost-motion limiting engagement with said backing plate.

5. The structure of claim 1, in which said fluid-pressure operated means is a flatjack.

6. Removable end-closure structure for sealed application to the end of a pipe of given outside diameter for hydrostatic pressure-testing the pipe, said structure comprising a circumferentially continuous anchor ring of inside diameter to clear the outer diameter of the pipe and having a conically tapered bore to be positioned for divergence in the direction of the pipe end when placed over the pipe end, radially displaceable wedge means adapted for inwardly cammed wedge engagement between the tapered bore of the anchor ring and the outer surface of the pipe end, said inwardly cammed engagement developing upon anchor-ring displacement in the axial direction of the pipe end, a first or closure plate of diameter to lap the end of the pipe but less than the outer diameter of said anchor ring and adapted for sealed engagement to the end of the pipe, said closure plate being adapted for circumferentially continuous axially abutted sealing engagement with the end of the pipe, a second or back-up plate substantially fully overlapping said first plate and of substantially the outer diameter of said anchor ring, lost-motion retaining means coaxially retaining said plates within a fixedly limited maximum axial offset of said back-up plate from said closure plate, axially adjustable tie means between radially lapping regions of said anchor ring and backing plate, and a fluid-pressure operated flat jack interposed between said plates for pressure-loading said plates for their axially separating relative displacement within said axial offset and in the direction of approach to the maximum of said axial offset, said flat jack contacting both said plates over substantially the internal section area of the pipe.

7. The structure of claim 6, in which said closure plate is characterized by a circumferentially continuous rabbet, a circumferentially continuous supply of gasket material seated in said rabbet, said rabbet being radially outwardly open, and a circumferential strap peripherally secured to said closure plate and axially spanning the rabbeted region.

8. The structure of claim 6, in which said wedge means is a circumferentially split ring.

9. The structure of claim 8, in which said split ring has a cylindrical inner surface and a conically tapering outer surface for coaction with the tapered bore of said anchor ring.

10. The structure of claim 6, in which said flat jack is of outer diameter less than the inside diameter of the pipe, thereby establishing an annulus of pipe closure radially outside the flat jack, a plurality of angularly spaced aligned bores in both plates and within said annulus, a plurality of nipples fitted to the respective bores of said first plate and extending through and guided by the respective aligned bores of said second plate, at least one further guide bore in said second plate within the area of flat jack overlap, and at least one nipple carried by said flat jack and having guided passage through said further guide bore.

11. Removable end-closure structure for sealed application to the end of a pipe of given outside diameter for hydrostatic pressure-testing the pipe, said structure comprising a circumferentially continuous anchor ring of inside diameter to clear the outer diameter of the pipe and having a conically tapered bore to be positioned for divergence in the direction of the pipe end when placed over the pipe end, radially displaceable wedge means adapted for inwardly cammed wedge engagement between the tapered bore of the anchor ring and the outer surface of the pipe end, said inwardly cammed engagement developing upon anchor-ring displacement in the axial direction of the pipe end, a first or closure plate of diameter to lap the end of the pipe but less than the outer diameter of said anchor ring, said closure plate being adapted for circumferentially continuous axially abutted sealing engagement with the end of the pipe, a second or back-up plate of substantially the outer diameter of said anchor ring, lost-motion retaining means coaxially retaining said plates within a fixedly limited maximum axial offset of said back-up plate from said closure plate, axially adjustable tie means between radially lapping regions of said anchor ring and backing plate, and fluid-pressure operated means interposed between said plates for pressure-loading said plates for their axially separating relative displacement within said axial offset and in the direction of approach to the maximum of said axial offset, said wedge means comprising an angularly spaced plurality of like wedge elements, and circumferentially extending flexible means supporting the spaced relation of said wedge elements.

12. The structure of claim 11, in which said flexible means includes a cable successively linking said wedge elements at passage through at least one aperture in each of said wedge elements.

13. The structure of claim 11, in which said flexible means comprises two axially spaced circumferential cables, axially extending spacer elements each of which elements has two axially spaced openings for reception of the respective cables, said spacer elements being in angularly distributed interlace with said wedge elements, and said wedge elements having cable-locating formations which are axially spaced in accordance with the axial spacing of said cables.

* * * * *